(12) United States Patent
Bosworth et al.

(10) Patent No.: US 9,876,752 B2
(45) Date of Patent: **\*Jan. 23, 2018**

(54) LOCATION AWARE STICKY NOTES

(71) Applicant: Facebook, Inc., Menlo Park, CA (US)

(72) Inventors: Andrew Garrod Bosworth, San Mateo, CA (US); David Harry Garcia, Sunnyvale, CA (US); Kenneth M. Lau, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,894

(22) Filed: Sep. 23, 2016

(65) Prior Publication Data

US 2017/0012928 A1 Jan. 12, 2017

Related U.S. Application Data

(63) Continuation of application No. 14/560,235, filed on Dec. 4, 2014, now Pat. No. 9,467,414, which is a continuation of application No. 13/300,919, filed on Nov. 21, 2011, now Pat. No. 8,935,341.

(51) Int. Cl.
*H04L 12/58* (2006.01)
*H04W 4/18* (2009.01)
*H04L 29/08* (2006.01)
*H04W 4/20* (2009.01)
*H04W 4/02* (2009.01)
*G06Q 50/00* (2012.01)

(52) U.S. Cl.
CPC ............ *H04L 51/32* (2013.01); *H04L 67/306* (2013.01); *H04W 4/023* (2013.01); *H04W 4/028* (2013.01); *H04W 4/185* (2013.01); *H04W 4/206* (2013.01); *G06Q 50/01* (2013.01); *H04W 4/02* (2013.01)

(58) Field of Classification Search
CPC ......... H04L 51/32; H04L 67/306; H04L 4/02; H04L 4/028; H04L 4/023; H04L 4/206; H04W 4/02; H04W 4/028; H04W 4/023; H04W 4/206; H04W 4/185
See application file for complete search history.

(56) References Cited

U.S. PATENT DOCUMENTS

| 8,054,180 B1 * | 11/2011 | Scofield ................ G06Q 30/06 340/539.11 |
| 2007/0161382 A1 * | 7/2007 | Melinger ................ H04L 67/18 455/456.1 |
| 2008/0076400 A1 * | 3/2008 | Moosavi ............. G06Q 30/0601 455/418 |

(Continued)

*Primary Examiner* — Robert Leung
(74) *Attorney, Agent, or Firm* — Baker Botts L.L.P.

(57) ABSTRACT

In one embodiment, note is received from a first user, comprising a message and a first location. The first location may be specified by the first user. A number of second users are identified based on a respective second location of each identified second user being within a threshold distance of the first location. The message of the note is sent to the identified second users. When the message is sent, it is determined whether a current location of the first user is within a predetermined distance from the first location. If the current location is within the predetermined distance, a notification is sent to the first user informing the first user that the message has been sent to the identified second users.

20 Claims, 6 Drawing Sheets

(56) References Cited

U.S. PATENT DOCUMENTS

| | | | |
|---|---|---|---|
| 2008/0132251 A1* | 6/2008 | Altman | G06Q 30/0207 |
| | | | 455/457 |
| 2009/0248833 A1* | 10/2009 | Frazier | G06F 17/30041 |
| | | | 709/217 |
| 2011/0055321 A1* | 3/2011 | Loeb | B60R 22/34 |
| | | | 709/203 |
| 2011/0057790 A1* | 3/2011 | Martin | G06Q 10/109 |
| | | | 340/539.13 |
| 2011/0238755 A1* | 9/2011 | Khan | G06Q 50/01 |
| | | | 709/204 |
| 2011/0313874 A1* | 12/2011 | Hardie | H04W 4/02 |
| | | | 705/26.1 |
| 2012/0270563 A1* | 10/2012 | Sayed | H04W 4/021 |
| | | | 455/456.3 |

\* cited by examiner ically-triggered note.
LOCATION AWARE STICKY NOTES

PRIORITY

This application is a continuation under 35 U.S.C. § 120 of U.S. patent application Ser. No. 14/560,235, filed 4 Dec. 2014, which is a continuation under 35 U.S.C. § 120 of U.S. patent application Ser. No. 13/300,919, filed 21 Nov. 2011, now issued as U.S. Pat. No. 8,935,341.

TECHNICAL FIELD

The present disclosure generally relates to location-aware applications, and more particularly, to systems allowing a user to leave electronic, location-triggered note messages for other users.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to creating for a first user a location-triggered note associated with a first location of the first user, determining a second user's location, and transmitting the location-triggered note to the second user if the second user is at or near the first location. These and other features, aspects, and advantages of the disclosure are described in more detail below in the detailed description and in conjunction with the following figures.

DETAILED DESCRIPTION

Figure 1:
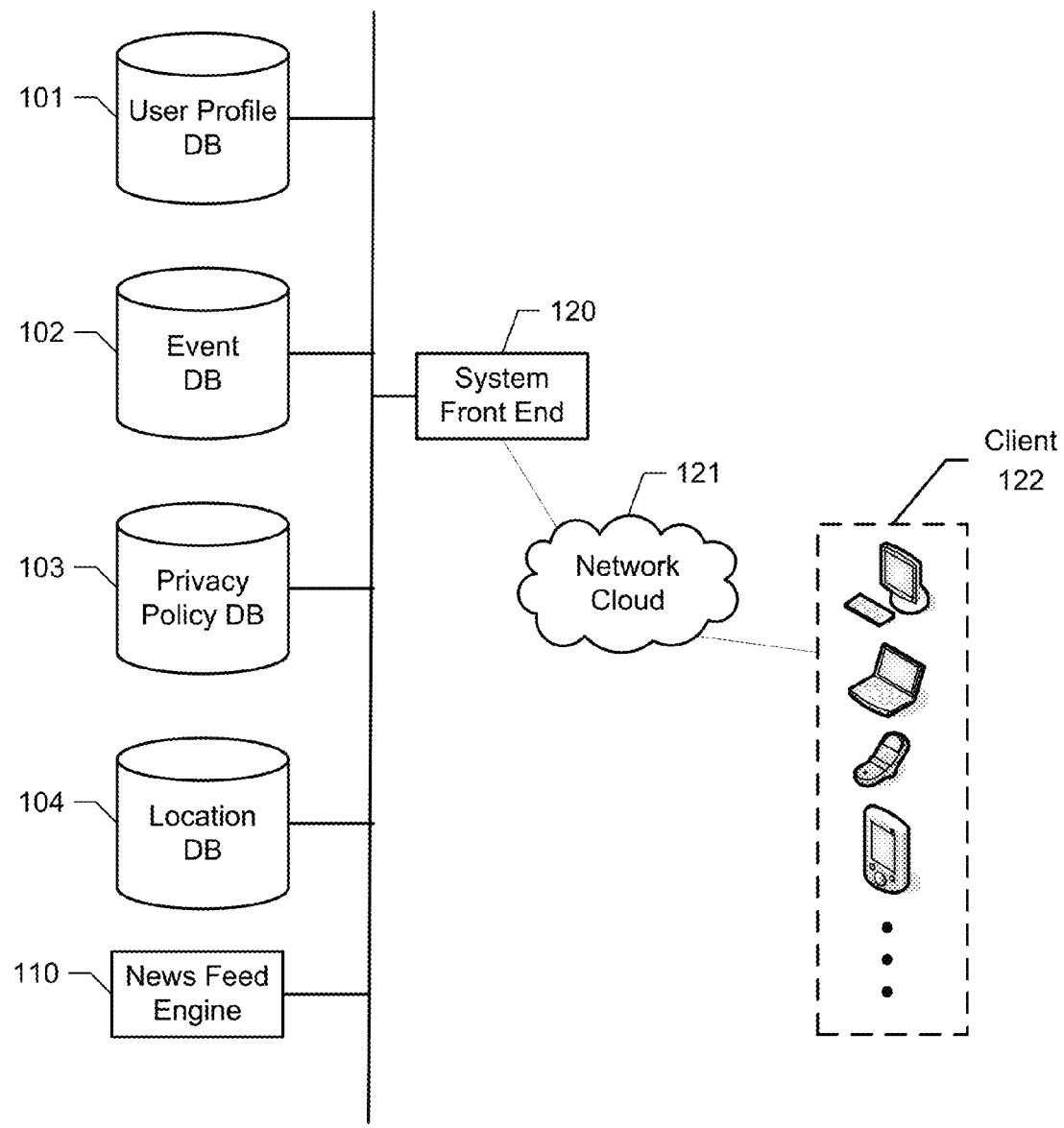
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, news feed engine 110 may access user profile database 101, event database 102, and location database 104 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, and location database 104 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

Ordinarily, when a user creates an online record related to a location, the record can be shown to other users, regardless locations of the other users. For example, when a user posts a review about a restaurant in a business review web site, other users can access the review anywhere with an access to the business review web site. Particular embodiments herein describe methods of creating for a first user a location-triggered note associated with a particular location, wherein the note is accessible to a second user only when the second user is at or near the particular location. For example, a first user may create a note about a particular restaurant (e.g., "Try the buffalo wings in this place!"). Instead of posting the note to a web page, particular embodiments herein may only transmit the note to a second user when the second user is at the particular restaurant.

Figure 2:
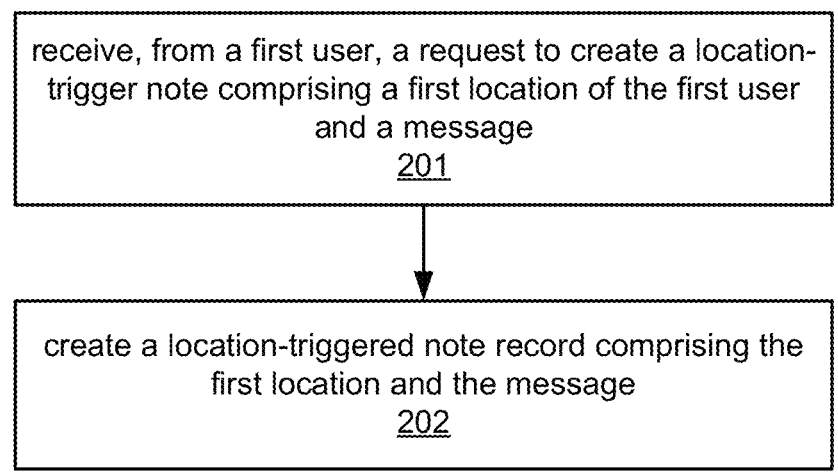
FIG. 2 illustrates an example method of creating a location-triggered note.

FIG. 2 illustrates an example method of creating a location-triggered note. FIG. 2 can be implemented by a location-triggered note process hosted by one or more computing devices of a social networking system. In particular embodiments, the location-triggered note process may receive, from a first user, a request to create a location-triggered note comprising a first location of the first user and a message (201). A message may comprise a text string (e.g., a scribbling note, a comment, a restaurant review), a media object (e.g., a photo, a video clip), an URL link to a web page or an application (e.g., an online game), or any combination thereof. For example, a first user can access a special-purpose client application hosted by the first user's GPS-equipped mobile device and enter a message at a user interface of the special-purpose client application, causing the special-purpose client application to transmit to the social networking system a request including a user identifier of the social networking system for the first user, the message, and a pair of GPS coordinates corresponding to the first user's current location. For example, a first user can access a map with a current GPS location displayed in a graphical user interface of a client-application hosted by the first user's GPS-equipped mobile device, select a location or region in the map, and enter a message in a dialog box displayed in the graphical user interface, causing the client application to transmit to the social networking system a request including a user identifier of the social networking system for the first user, the message, and a pair of GPS coordinates corresponding to the selected location or region. For example, a first user may access a web page (in a graphical user interface of a client application hosted by the first user's client device) for a particular place and check in to the particular place. Alternatively, a first user may check in to a particular place by accessing a mobile client application, and be presented a web page for the particular place. The first user may enter a message for a request for a location-triggered note at the place web page (e.g., enter a message at a "leave a note here" dialog box in the web page), causing the client application to transmit the request for a location-triggered note and the message to the social networking system, while the location-triggered note process can determine a location for the request based on the first user's check-in activity (e.g., the particular place, or a geographical location corresponding to the particular place).

In some embodiments, a request to create a location-triggered note may further comprise one or more privacy settings. For example, when a first user enters a message for a request creating a location-triggered note from the special-purpose client application (or the web page for the particular place) described above, the first user can further specify one or more privacy settings. The first user may specify a privacy setting that the location-triggered note is accessible to users who are within a threshold degree of separation from the first user (e.g., the first user's first-degree social contacts). The first user may specify a privacy setting that the location-triggered note is accessible to one or more particular users— i.e., one or more intended recipients (e.g., the first user's roommates). The first user may specify a privacy setting that the location-triggered note is not accessible to one or more particular users. The first user may specify a privacy setting that the location-triggered note is accessible to users who are in a particular group or share a common interest (e.g., users who went to the same college, users who like a place page of a particular sports team). The first user may specify a privacy setting that the location-triggered note is not accessible to users who are in a particular group or share a common interest (e.g., the first user may wan to leave the location-triggered note with the first user's first-degree social contacts, but not with those who went to a particular college). In other embodiments, the social networking system may specify one or more default privacy settings for a location-triggered note (e.g., accessible to all users in the social networking system, accessible to the requesting user's first-degree social contacts).

In particular embodiments, the location-triggered note process may create a location-triggered note record comprising the first location and the message (202). In some embodiments, the location-triggered process may create a location triggered note record comprising the first location, the message, and one or more privacy settings and/or information on one or more intended recipients (e.g., one or more privacy settings specified by the first user, one or more default privacy settings). In some embodiments, the location-triggered process may store the location triggered note record in location database 104.

Figure 3:
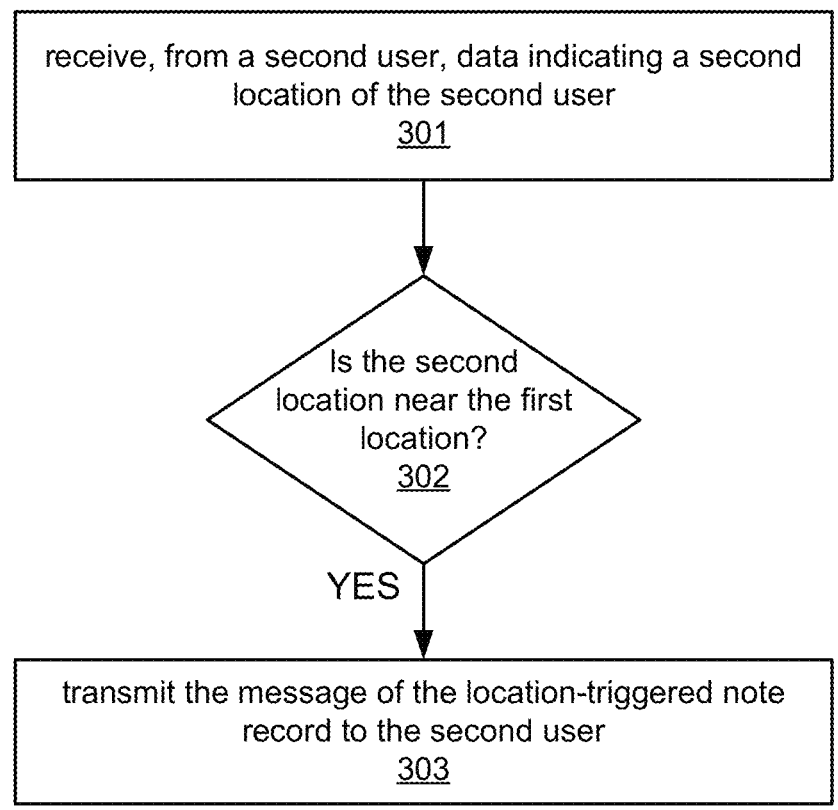
FIG. 3 illustrates an example method of transmitting a location-triggered note.

FIG. 3 illustrates an example method of transmitting a location-triggered note. In particular embodiments, the location-triggered note process may receive, from a second user, data indicating a second location of the second user (301). For example, the location-triggered note process can receive GPS coordinates transmitted from the second user's GPS-equipped mobile device. For example, the location-triggered note process may access location database 104 for a recent location check-in activity of the second user (e.g., a recent location check-in by the second user, or a recent location check-in of the second user by another user). Other methods for identifying the location of the second user may include data reports from POS terminals or mobile devices of other users that have interacted with the second user's mobile phone via BlueTooth or Near-Field Communications protocols.

In particular embodiments, the location-triggered note process may determine whether the location-triggered note record is accessible to the second user based at least in part on a comparison between the first location and the second location. In particular embodiments, the location-triggered note process may determine whether the location-triggered note record is accessible to the second user based on at least in part on whether the second location is within a threshold distance (e.g., 500 feet) from the first location (302). That is, the location-triggered note record can be accessible to the second user if the second user is at or near the first location. In some embodiments, the location-triggered note process may further determine whether the location-triggered note record is accessible to the second user further based on one or more privacy settings. If a privacy setting limiting access to the location-triggered note record to the first user's first-degree social contact, for example, then the location-triggered note is available to a second user only if the second user is the first user's first-degree contact, and the second user is at or near the first location. In one embodiment, the location-triggered note process may determine whether the location-triggered note record is accessible to the second user based on whether the location-triggered note record was created within a threshold time (e.g., the record was created within five days). That is, the location-triggered note process may disregard location-triggered note records that are not recently created.

Figure 3A:
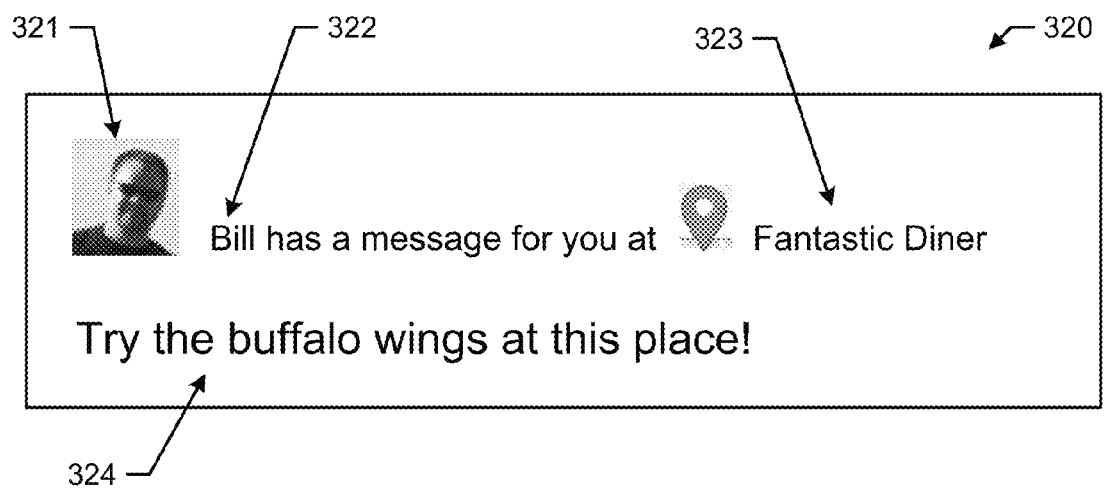
FIG. 3A illustrates an example message of a location-triggered note.

In particular embodiments, the location-triggered note process may transmit the message of the location-triggered note record to the second user if the note is accessible to the second user (303). For example, the location-triggered note process can transmit the message the second user's mobile device, causing a client application hosted by the second user's mobile device to display the message in a graphical user interface of the client application. FIG. 3A illustrated an example message of a location-triggered note. As illustrated in the example of FIG. 3A, the location-triggered note process may transmit to the second user a notification 320 (e.g., constructed with <iframe> in a structured document) including a user name of the first user 321 (e.g., "Bill"), the first location 323 (e.g., "Fantastic Diner"), and the message 324 (e.g., "Try the buffalo wings at this place"). The notification may further include a user profile picture thumbnail 321 of the first user. For example, as the second user checks in to a particular place corresponding to the first location (e.g., from a special-purpose client application), the location-triggered note process can incorporate the message (or a link to the message) in a web page for the particular place to be presented to the second user. For example, the location-triggered note process can transmit the message to the second user's client device by using a push notification (e.g., an email, an instant message, an short message service or SMS message, a phone call) incorporating the message. For example, the location-triggered note process can cause news feed engine 110 to create a news feed entry comprising the message. For example, the news feed engine 110 can add the news feed entry to a news feed to be displayed in the second user's profile page. Furthermore, the location-triggered note process may post the message of the location-triggered note record to a web page (or a structured document) of a place an/or an event with a location corresponding to the first location when the second user is near the first location. For example, the news feed engine 110 can add the news feed entry to a news feed to be displayed in a profile page of a place corresponding to the first location. For example, the news feed engine 110 can add the news feed entry to a news feed to be displayed in a profile page of an event at the first location. In one embodiments, the location-triggered note process may receive data indicating a second location of the second user, determine one or more location-triggered note records accessible to the second user (e.g., one or more location-triggered note records with locations in a vicinity of the second location), and transmitting locations and messages of the one or more location-triggered note records to the second user, causing a client application hosted by the second user's computing device to present the one or more location-triggered note records to the second user—e.g., in a map incorporating the locations of the one or more location-triggered note records in a graphical user interface of the client application. In another embodiment, the location-triggered note process may transmit a notification (e.g., an email, an SMS message, an instant message, an news feed entry update to the news feed for the first user's profile page) to the first user indicating the second user is at or near the first location, and/or the second user has accessed the message. Yet in another embodiment, the location-triggered note process may transmit a notification to the first user, when the first user is at or near the first location (e.g., determined by the first user's GPS coordinates or check-in activities), indicating the second user is at or near the first location, and/or the second user has access the message, while allowing the first user potentially to meet the second user at the first location.

Figure 4:
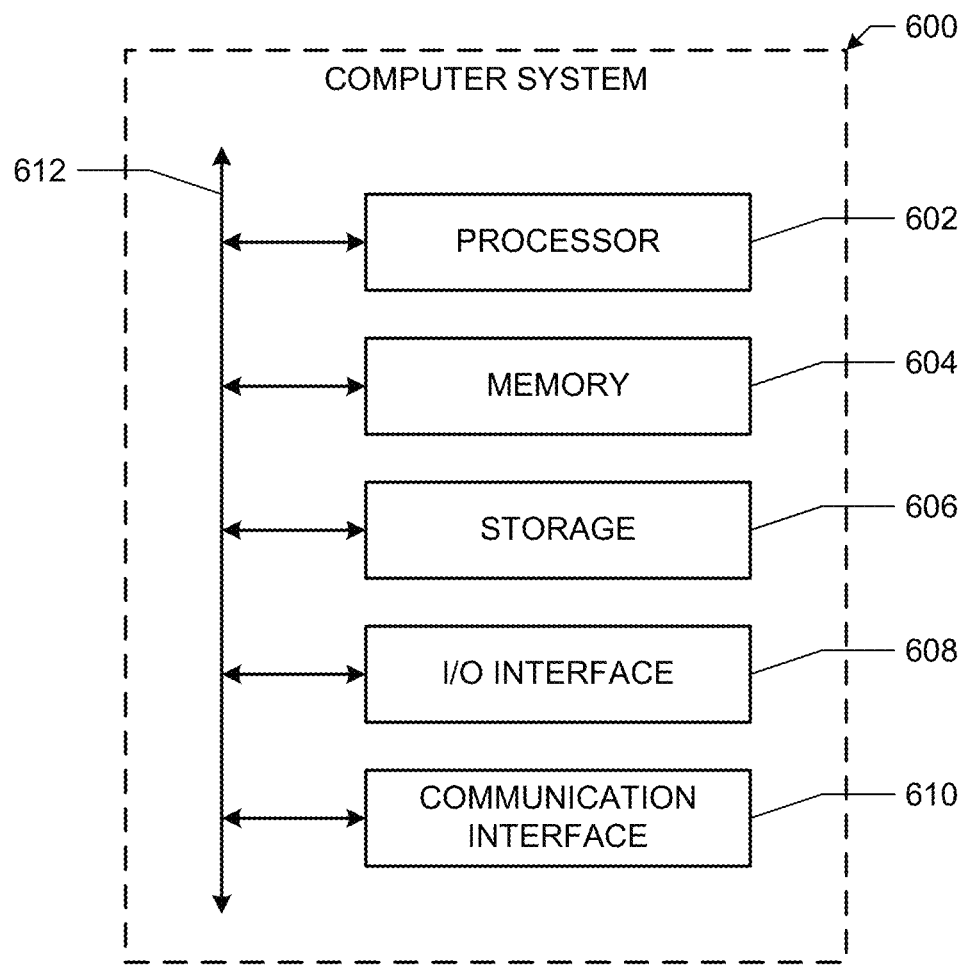
FIG. 4 illustrates an example computer system.

FIG. 4 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I$^2$C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 5:
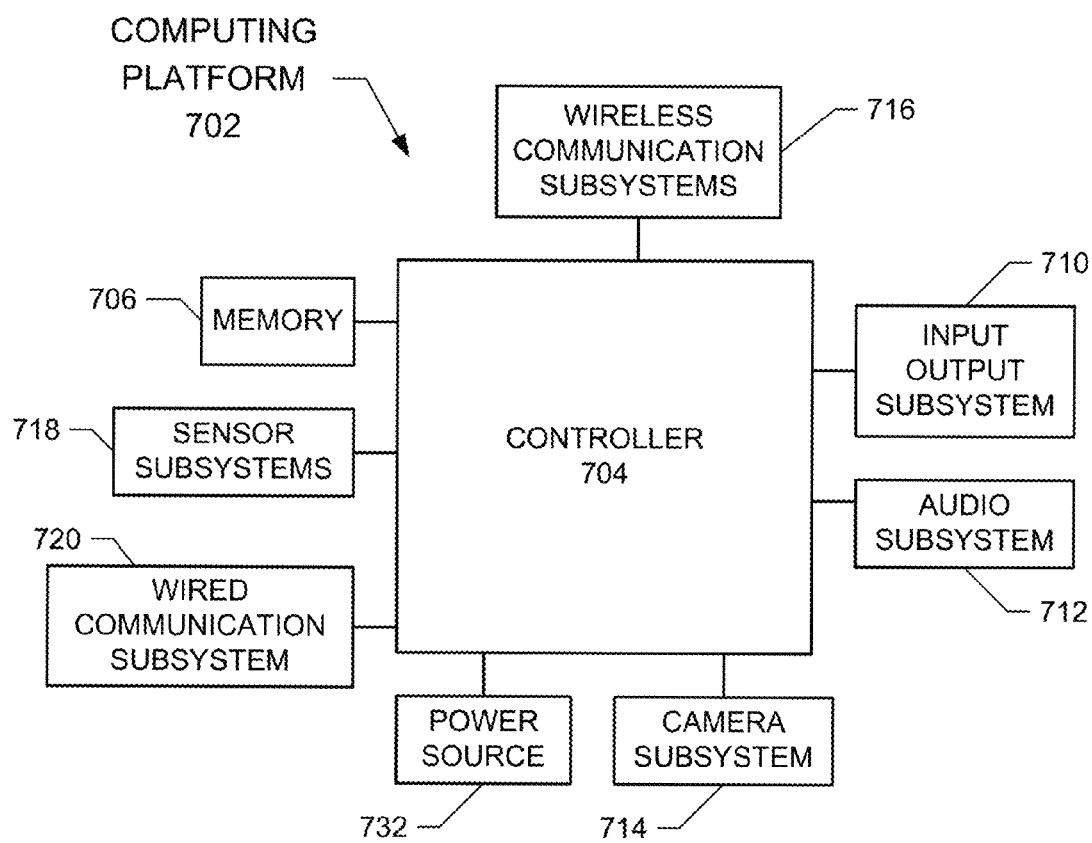
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/ or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit ($I^2C$) bus, a Secure Digital (SD) memory interface, a Secure Digital Input Output (SDIO) interface, a Universal Serial Bus (USB) bus, a General Purpose Input/ Output (GPIO) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by one or more computing devices, receiving a note from a first user, wherein the note comprises a first location and a message;
   by the one or more computing devices, identifying one or more second users, wherein the identifying of each of the one or more second users is based at least in part on a second location associated with the second user, wherein the second location is within a threshold distance of the first location;
   by the one or more computing devices, sending the message of the note to the identified second users;
   by the one or more computing devices, in response to sending the message, determining whether a current location of the first user is within a predetermined distance from the first location; and
   by the one or more computing devices, in response to determining that the current location of the first user is within the predetermined distance from the first location, sending to the first user a notification, the notification comprising a reference to the sending of the message.

2. The method of claim 1, wherein the first location is specified by the first user.

3. The method of claim 1, wherein identifying the second users is further based on one or more privacy settings defining one or more users having access to the note-record.

4. The method of claim 3, wherein the one or more privacy settings are default privacy settings associated with the first user.

5. The method of claim 3, wherein the one or more privacy settings are defined by the first user in the request to create the note.

6. The method of claim 1, wherein the sending the message of the note-record to the second users comprises sending to the second users a note-notification comprising a user name of the first user, the first location, and the message.

7. The method of claim 6, wherein the note-notification further comprises a profile picture of the first user.

8. The method of claim 6, wherein the note-notification is an email, an SMS message, an instant message, or a phone call.

9. The method of claim 1, wherein the sending the message of the note-record to the second users comprises:
creating a news feed entry comprising a user name of the first user, the first location and the message; and
updating a news feed for a profile page of the second users with the news feed entry.

10. The method of claim 1, wherein the notification further comprises an indication that the second users are at or near the first location.

11. The method of claim 1, wherein receiving the note from the first user further comprises determining a first user-interest associated with the first user.

12. The method of claim 1, wherein the first user-interest is defined by the first user.

13. The method of claim 1, wherein identifying the second users is based at least in part on comparing a second user-interest of each second user to the first user-interest.

14. The method of claim 13, wherein the second users are identified if one or more of the second user-interests correspond to the first user-interest.

15. The method of claim 13, wherein the second users are not identified if one or more of the second user-interests correspond to the first user-interest.

16. The method of claim 1, wherein the second locations are determined by recent check-in activities of the second users.

17. The method of claim 1, wherein the second locations are determined by GPS coordinates sent by one or more mobile computing devices of the second users.

18. The method of claim 1, wherein the sending the message is further based on the time that the note was received from the first user.

19. One or more non-transitory computer-readable tangible storage media embodying software operable when executed by one or more computing devices to:
receive a note from a first user, wherein the note comprises a first location and a message;
identify one or more second users, wherein the identifying of each of the one or more second users is based at least in part on a second location associated with the second user, wherein the second location is within a threshold distance of the first location;
send the message of the note to the identified second users;
in response to sending the message determine whether a current location of the first user is within a predetermined distance from the first location; and
in response to determining that the current location of the first user is within the predetermined distance from the first location, send to the first user a notification, the notification comprising a reference to the sending of the message.

20. A system comprising:
a memory;
one or more processors; and
a non-transitory storage medium storing computer-readable instructions operative, when executed, to cause the one or more processors to:
receive a note from a first user, wherein the note comprises a first location and a message;
identify one or more second users, wherein the identifying of each of the one or more second users is based at least in part on a second location associated with the second user, wherein the second location is within a threshold distance of the first location;
send the message of the note to the identified second users;
in response to sending the message determine whether a current location of the first user is within a predetermined distance from the first location; and
in response to determining that the current location of the first user is within the predetermined distance from the first location, send to the first user a notification, the notification comprising a reference to the sending of the message.

* * * * *